May 15, 1956　　　W. G. WEATHERLY　　　2,745,696
TAIL GATE FOR TRUCKS
Filed Oct. 8, 1954
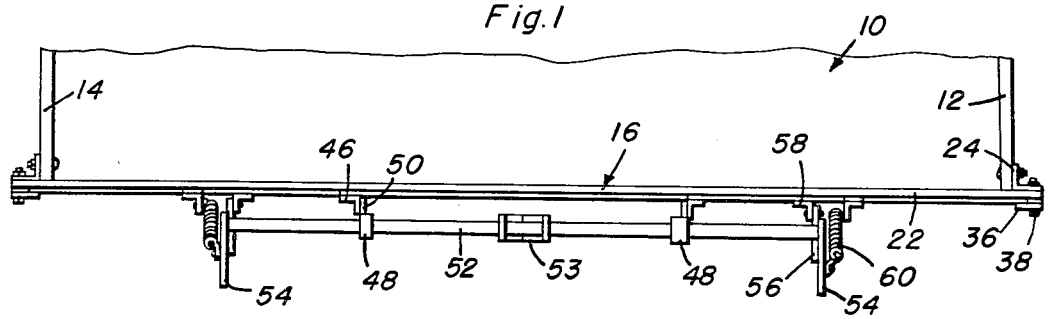
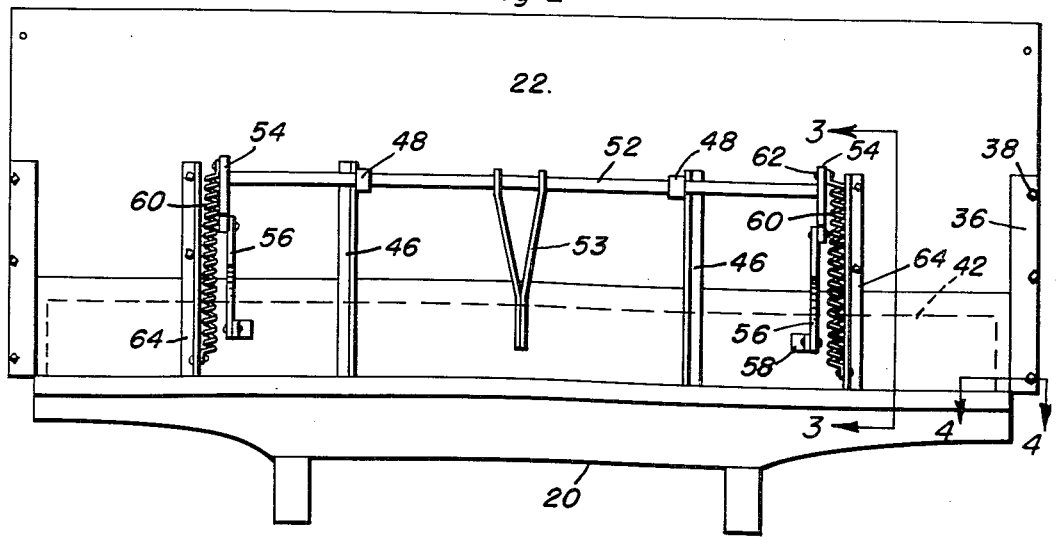
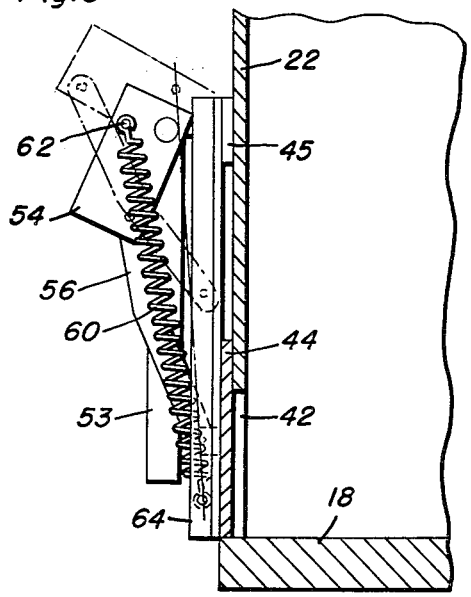
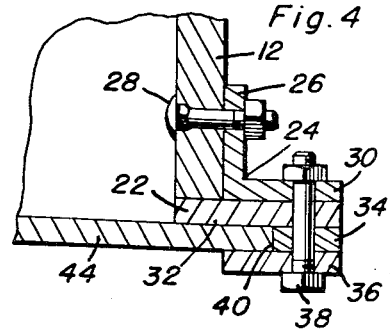
William G. Weatherly
INVENTOR
BY James Heinman
ATTORNEY

United States Patent Office 2,745,696
Patented May 15, 1956

2,745,696

TAIL GATE FOR TRUCKS

William G. Weatherly, Clarkston, Wash.

Application October 8, 1954, Serial No. 461,255

3 Claims. (Cl. 296—51)

This invention relates to a novel tail gate assembly for a truck and is especially designed for use in the controlled discharge of bulk materials, such as grain, sand and the like.

A primary object of this invention is to provide a sturdy and compact tail gate assembly which includes a fixed wall member, having a discharge opening for material flow, and a vertically slidable gate valve member closing off the opening and being easily moved by a dependable and simple lever means to an open position and securely held in an open position by a spring means which is responsive to the movement of the lever means in opening the gate valve member.

A further object of this invention is to provide guide means for guiding the gate valve member in a rectilinear path so that the gate valve member moves smoothly and effectively closes off the flow of material when it is automatically closed under the pull of the spring means.

A further object of this invention is to provide lever means for translating an easily effected rotational movement of a lever into a sliding movement of the gate valve member.

A further object of this invention is to provide means for fixedly securing the ends of the fixed end wall member to the side walls of the truck body and to provide channel in said means for guidingly receiving the ends of the gate valve member.

The foregoing and ancillary objects are attained by this invention, the preferred form of which is set forth in the following description and illustrated in the attached drawing, wherein:

Figure 1 is a top plan view of the tail gate assembly;

Figure 2 is a front elevational view thereof;

Figure 3 is a vertical sectional view taken on line 3—3 of Figure 2, and,

Figure 4 is a detailed cross-sectional view taken on line 4—4 of Figure 2.

Referring now more particularly to the drawing, the numeral 10 generally designates a truck body which includes opposing side wall members 12 and 14 and a tail gate assembly 16. The wall members and tail gate assembly are mounted on a bottom wall or floor 18 which is preferably metallic and is mounted on the frame 20.

The tail gate assembly includes a fixed wall member 22 which is secured at its end edges to the ends of the side walls, as shown in Figure 4. Angle irons 24 have their flanges 26 bolted by bolts 28 to the exterior of the side walls at the ends thereof so that the flanges 30 of the angle irons project laterally from the side walls flush with the ends. The end portions 32 of the fixed end wall member 22 abut the ends of the side walls and the flanges 30 and terminate flush with the free edges of the flanges. A spacer block 34 is disposed against the outside of the end portions and a clamp strip 36 is disposed over the spacer block. Bolts 38 secure the parts together. It will be noted that the clamp strip is wider than the spacer block so that it has an inside edge portion disposed in spaced confronting relation with the end portion of the fixed end wall member 22 to form the side walls of a vertical guide channel 40 disposed at each end of the side walls 12 and 14. The inner side edge of the spacer block forms the end wall of the channel 40.

The fixed end wall 22 has a bottom edge opening 42 which extends almost the full width of the wall and defines a material discharge opening. A movable gate valve member or plate 44 is disposed at the outside of the end wall 22 and has its ends slidably disposed in the channels 40. The gate valve member is higher than the opening 42 so that when the bottom edge of the gate valve member is seated on the floor the opening is entirely closed off. A stop 45 is secured to the securing means for the end wall and overlies the gate valve member, as shown in Figure 3.

Angle irons 46 upstand from the end of the floor and are secured to the fixed end wall 22. Bearings 48 are secured by arms 50 to the outstanding flanges of the angle irons and are disposed in alignment transversely of the end wall to rotatably support a rod 52. A yoke type hand lever 53 is fixed to the center of the rod between the bearings and is provided to manually effect the desired rotation of the rod.

Arms 54 are fixed on the ends of the rod and are moved in a curvilinear path when the rod is rotated in a clockwise direction by an upward swinging movement of the lever. The arms are rectangular and are fixed to the rod ends at their inner upper corners. Links 56 are pivotally attached at their upper ends to the arms at the lower innei corners thereof and are pivotally attached at their lower ends to apertured ears 58, which are fixed on the outside of the gate valve member. The links 56 translate the swinging movement of the arms to a sliding movement of the gate valve member which is moved thereby.

Coil springs 60 are fixed at their upper ends by pins 62 to the arms, the pins being disposed outwardly from the rod ends and being spaced radially outwardly therefrom. The lower ends of the springs are anchored to the lower ends of angle irons 64 which are fixed to the end wall 22 and upstand from the floor.

In use, the gate valve member is raised to expose the opening 42 and permit the flow of material therethrough by lifting the lever 53 and thereby rotating the rod to swing the arms 54 outwardly and upwardly. The links 56 pull the gate valve member upwardly as the arms swing upwardly and the springs 60 are expanded with the pins 62 moving over across the rod and to a position off center inward thereof. In such position, the springs hold the gate valve member in an open position. When the lever is slightly moved downwardly to bring the pins 62 past center the springs move the gate valve member quickly to a completely closed position and hold it in such position.

I claim:

1. A tail gate assembly comprising a fixed end wall member having an opening, means fixedly securing the ends of said end wall member to the side walls of a truck, a gate valve member slidable on the end wall member, said means fixedly securing the ends of said end wall member including channels guidingly holding the gate valve member, links pivotally attached to the gate valve member, a rod rotatably carried by the end wall member, arms fixed thereon and pivotally carrying the links whereby rotation of the rod will swing the arms to move the gate valve member through the links and springs attached to the fixed end wall member and to the arms, said springs being attached to the arms so that the springs hold the gate valve member in open and closed positions by movement past the center of the rod.

2. A tail gate assembly for a truck having side walls and a floor including an end wall fixed to the side walls, means fixedly securing the ends of the end wall to the side walls, said end wall having an opening at its lower end and extending substantially the entire width of the end wall above the floor, a gate valve member vertically slidable on the end wall and substantially coextensive in width therewith, said means securing the end wall including vertical guide channels receiving the ends of the gate valve member, a rotatable member rotatably carried transversely by the end wall above the gate valve member and opening, arms fixed on the member, links pivotally attached to the gate valve member and to the arms which swing upwardly and outwardly to lift the gate valve member by means of the links and spring means connected to said fixed end wall and to the arms for holding the gate valve member in open and closed positions.

3. A tail gate assembly as claimed in claim 2, wherein said last means includes vertically disposed coil springs attached to the fixed end wall at their lower ends and to the arms at their upper ends in position to move past the center of the rod to opposite sides thereof.

References Cited in the file of this patent

UNITED STATES PATENTS

| | | |
|---|---|---|
| 1,204,971 | Gordon | Nov. 14, 1916 |
| 1,574,031 | Hecht | Feb. 23, 1926 |
| 2,635,688 | Bruning | Apr. 21, 1953 |
| 2,651,542 | Meyer | Sept. 8, 1953 |